United States Patent
Yeo et al.

(10) Patent No.: US 10,069,340 B2
(45) Date of Patent: Sep. 4, 2018

(54) WIRELESS POWER RECEIVER FOR ADJUSTING MAGNITUDE OF WIRELESS POWER

(71) Applicants: Samsung Electronics Co., Ltd., Gyeonggi-do (KR); Korea Advanced Institute of Science and Technology, Daejeon (KR)

(72) Inventors: Sung-Ku Yeo, Daejeon (KR); Gyu-Hyeong Cho, Daejeon (KR); Se-Ki Kim, Jeollabuk-do (KR); Yu-Su Kim, Gyeonggi-do (KR); Se-Ho Park, Gyeonggi-do (KR); Jun-Han Choi, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 742 days.

(21) Appl. No.: 13/656,142

(22) Filed: Oct. 19, 2012

(65) Prior Publication Data

US 2013/0099588 A1    Apr. 25, 2013

(30) Foreign Application Priority Data

Oct. 19, 2011    (KR) .................. 10-2011-0107179

(51) Int. Cl.
*H01F 27/42* (2006.01)
*H01F 37/00* (2006.01)
(Continued)

(52) U.S. Cl.
CPC .............. *H02J 50/12* (2016.02); *H02J 7/025* (2013.01); *H02J 50/10* (2016.02); *H02J 50/80* (2016.02); *H02M 7/2176* (2013.01)

(58) Field of Classification Search
CPC .......... H02J 17/00; H02J 17/005; H02J 7/025; H02J 50/12; H02J 50/10; H02M 7/2176; H01F 38/14

See application file for complete search history.

(56) References Cited

U.S. PATENT DOCUMENTS

| | | | | |
|---|---|---|---|---|
| 6,057,668 A | * | 5/2000 | Chao ...................... | H02J 7/025 320/108 |
| 6,750,560 B1 | * | 6/2004 | Nishimoto .............. | H02J 7/025 307/1 |

(Continued)

FOREIGN PATENT DOCUMENTS

| | | |
|---|---|---|
| JP | 03-060360 | 3/1991 |
| KR | 1020100054885 | 5/2010 |
| KR | 1020100110356 | 10/2010 |

OTHER PUBLICATIONS

Korean Office Action dated Jul. 15, 2017 issued in counterpart application No. 10-2011-0107179, 12 pages.

(Continued)

*Primary Examiner* — Rexford Barnie
*Assistant Examiner* — Rasem Mourad
(74) *Attorney, Agent, or Firm* — The Farrell Law Firm, P.C.

(57) ABSTRACT

A wireless power receiver for wirelessly receiving power from a wireless power supplier includes a power receiver for receiving wireless power from the wireless power supplier and storing the wireless power for a first time period, a rectifier connected to the power receiver for rectifying the wireless power, a power adjuster connected to the rectifier and an output end, for adjusting a magnitude of the wireless power by enabling the power receiver to store the wireless power for the first time period and delivering the wireless (Continued)

power to the output end for a second time period, and a controller for determining the first and second time periods.

22 Claims, 9 Drawing Sheets

(51) Int. Cl.
    *H01F 38/00*     (2006.01)
    *H02J 50/12*     (2016.01)
    *H02J 7/02*     (2016.01)
    *H02J 50/80*     (2016.01)
    *H02M 7/217*     (2006.01)
    *H02J 50/10*     (2016.01)

(56) References Cited

U.S. PATENT DOCUMENTS

| | | |
|---|---|---|
| 6,879,809 B1 | 4/2005 | Vega et al. |
| 2005/0068019 A1* | 3/2005 | Nakamura ............... G06F 1/26 323/355 |
| 2007/0216392 A1 | 9/2007 | Stevens et al. |
| 2008/0157909 A1 | 7/2008 | Chen et al. |
| 2009/0160261 A1 | 6/2009 | Elo |
| 2009/0174263 A1 | 7/2009 | Baarman et al. |
| 2010/0001790 A1* | 1/2010 | Hashimoto ......... H01L 27/0629 327/566 |
| 2010/0277003 A1* | 11/2010 | Von Novak et al. ......... 307/104 |
| 2010/0321070 A1* | 12/2010 | Matsumoto .................. 327/109 |
| 2011/0119135 A1 | 5/2011 | Grilli et al. |
| 2012/0001608 A1* | 1/2012 | Sato .................... H02M 3/1588 323/282 |
| 2012/0104867 A1* | 5/2012 | Mudrick ................. H02J 7/025 307/104 |
| 2012/0155136 A1* | 6/2012 | Von Novak ............. H02J 5/005 363/126 |

OTHER PUBLICATIONS

European Search Report dated Sep. 27, 2017 issued in counterpart application No. 12188918.2-1804, 6 pages.

* cited by examiner

WIRELESS POWER RECEIVER FOR ADJUSTING MAGNITUDE OF WIRELESS POWER

PRIORITY

This application claims priority under 35 U.S.C. § 119(a) to a Korean Patent Application filed in the Korean Intellectual Property Office on Oct. 19, 2011, and assigned Serial No. 10-2011-0107179, the contents of which are incorporated herein by reference.

BACKGROUND OF THE INVENTION

1. Field of the Invention

The present invention relates generally to a wireless power receiver, and more particularly, to a wireless power receiver for wirelessly receiving power based on an electromagnetic resonance method.

2. Description of the Related Art

Mobile terminals, such as cell phones and Personal Digital Assistants (PDAs), are powered by naturally rechargeable batteries, and supply electric energy to the battery using a separate charging device in order to recharge the battery. Typically, the charging device and the battery are electrically connected by a connection of their outer-surface terminals to each other.

However, when using such a contact charging method, the contacting terminals are susceptible to contamination by dirt because they extend outward, thus suffering from inappropriate charging, and they may not be properly charged when exposed to moisture.

To address the problem, wireless charging or contactless charging technologies have recently been developed and applied to various electronic devices.

The wireless charging technology using wireless power transmission and reception enables, for example, a battery of a cell phone to be automatically charged by placing the cell phone on a charging pad without requiring a separate charging connector. This method is currently applied to wireless electric toothbrushes or a wireless electric shaver. From the wireless charging technology, the electronic device may benefit from enhanced waterproof and portable functions since no wired charging device is required. This technology is expected to be further developed in the burgeoning era of electric vehicles.

The wireless charging technology has an electromagnetic induction method using coils, a resonance method using resonance, and a Radio Frequency (RF)/micro wave radiation method that converts electric energy into microwaves for transmission.

Although it has thus far been dominated by the electromagnetic induction method, recent successful experiments of microwave-based wireless transmission from a few tens of meters a manner, both at home and abroad, indicate that all electronic products will be wirelessly recharged at any time and place, in the near future.

A power transmission method based on electromagnetic induction is based on transferring power between primary and secondary coils. Moving a magnet through a coil produces an induced current based on which a magnetic field is produced at the transmission end, and the change in the magnetic field at a receiving end induces a current to generate energy. This phenomenon is referred to as magnetic induction, and the power transmission method based on magnetic induction provides superior energy transmission efficiency.

With respect to the resonance method, Soljacic from the Massachusetts Institute of Technology (MIT) suggested a system to which electricity is delivered wirelessly even when the system is a few meters away from a charging device, using a resonance-based power transmission principle based on Coupled Mode Theory. The MIT team's wireless charging system is based on the resonance effect, a physical concept that a tuning fork being placed next to a wine glass causes the wine glass to ring with the same frequency. Electromagnetic waves carrying the electric energy are resonated instead of the sound. Resonant electric energy of the electromagnetic waves is directly transferred only when there is a device having the same resonant frequency and the non-used part of the energy is re-absorbed into the magnetic field rather than being dispersed in the air, and thus the resonant electric energy is not deemed harmful to surrounding machines or bodies.

However, a wireless power receiver based on the conventional resonance method includes a rectifier that converts a received Alternating Current (AC) into a Direct Current (DC) and a DC-to-DC converter that adjusts the rectified DC voltage to a voltage preset for an output end. However, since the DC-to-DC converter must use a bulky passive element, it is difficult to implement into the conventional method the wireless power receiver that satisfies both compactness in appearance and high output performance with high efficiency. Particularly, when the wireless power receiver is implemented in a mobile communication device such as a cell phone, such difficulty detrimentally affects the current trend of lighter and smaller mobile devices.

Furthermore, the DC-to-DC converter uses a frequency in a limited range of 2 to 3 MHz since it is an outwardly packaged active device.

In addition, the conventional wireless power receiver suffers from having to include an additional capacitor, such as for impedance matching, and an additional Zener diode for protection of the entire device.

SUMMARY OF THE INVENTION

The present invention provides a wireless power receiver for adjusting the magnitude of received wireless power by using switching.

In accordance with an aspect of the present invention, there is provided a wireless power receiver for wirelessly receiving power from a wireless power supplier including a power receiver for receiving wireless power from the wireless power supplier and storing the wireless power for a first time period, a rectifier connected to the power receiver for rectifying the wireless power, a power adjuster connected to the rectifier and an output end, for adjusting a magnitude of the wireless power by enabling the power receiver to store the wireless power for the first time period and delivering the wireless power to the output end for a second time period, and a controller for determining the first and second time periods.

In accordance with another aspect of the present invention, there is provided a method of controlling a wireless power receiver for wirelessly receiving power from a wireless power supplier, including receiving wireless power from the wireless power supplier, rectifying the wireless power, and adjusting a magnitude of the wireless power by preventing the wireless power from being output by disconnecting a path to an output end of the wireless power receiver for a first time period while outputting the wireless power for a second time period.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Figure 1A:
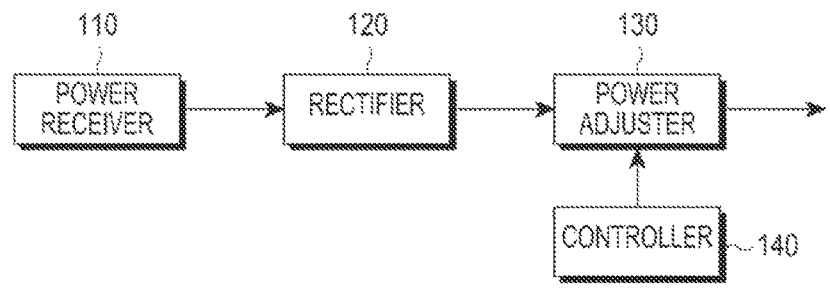
FIG. 1A illustrates a wireless power receiver, according to an embodiment of the present invention.

Hereinafter, embodiments of the present invention will be described in detail with reference to the accompanying drawings. In the following description, the same or similar elements may be designated by the same reference numerals in different drawings. Further, detailed descriptions of known functions and configurations incorporated herein may be omitted for the sake of clarity and conciseness.

FIG. 1A illustrates a wireless power receiver, according to an embodiment of the present invention.

The wireless power receiver includes a power receiver 110, a rectifier 120, a power adjuster 130, and a controller 140.

The power receiver 110 receives wireless power supplied by a wireless power supplier. The power may be received based on a resonance method, and thus may be implemented using a loop coil with inductance.

The power receiver 110 receives the wireless power by resonating with an electromagnetic field produced by the wireless power supplier. When the power receiver 110 is implemented with the loop coil, the inductance of the loop coil is changeable, so the implementation of receiving electromagnetic waves, i.e., the wireless power with various frequencies, may be made. A plurality of loop coils may also be used, and the present invention is not limited thereto, but may uses any means to receive the wireless power by resonating with the electromagnetic waves.

The rectifier 120 rectifies the input power from the power receiver 110. The rectifier 120 may be implemented with a well-known means, such as a diode, but is not limited thereto, and may use any means that serves as a rectifying means, such as by full-bridge diodes, which will be discussed below.

The power adjuster 130 receives and adjusts the magnitude of the wireless power rectified by the rectifier 110. The power adjuster 130 adjusts the magnitude of the wireless power by adjusting at least one of voltage and current of the received wireless power. Specifically, the power adjuster 130 may reduce the magnitude of the wireless power by adjusting the voltage of the wireless power.

The power adjuster 130 is electrically connected to the rectifier 120 and an output end (not shown). The power adjuster 130 enables the received power to be stored in the power receiver 110 by disconnecting a path between the rectifier 120 and the output end for a first time period. During the first time period, the wireless power circulates in a closed loop and is not delivered to the output end. However, the power receiver 110 may further include a storage area for storing the circulated wireless power for the first time period, which will be discussed below.

After the first time period, the power adjuster 130 electrically connects the rectifier 120 and the output end for a second time period by being short-circuited, thus having the wireless power delivered to the output end.

After the second time period, the power adjuster 130 re-stores the received power in the power receiver 110 by disconnecting the path between the rectifier 120 and the output end for the first time period.

In this manner, the wireless power may not be delivered to the output end during the first time period while being delivered to the output end during the second time period, which reduces the magnitude of the wireless power to be delivered to the output end by reducing an average voltage of the wireless power. This process is illustrated in FIGS. 1B to 1E.

Figure 1B:
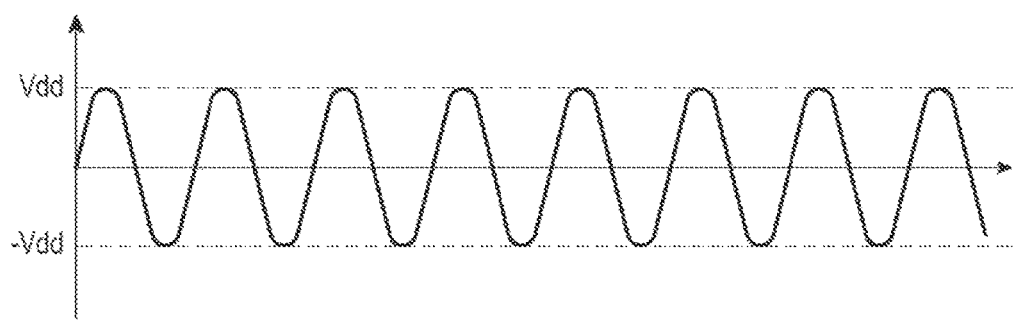
FIG. 1B illustrates wireless power input to a power receiver, according to an embodiment of the present invention.

FIG. 1B illustrates the wireless power input to the power receiver 110, according to an embodiment of the present invention. As illustrated in FIG. 1B, the wireless power is a waveform having a cycle and an amplitude Vdd.

Figure 1C:
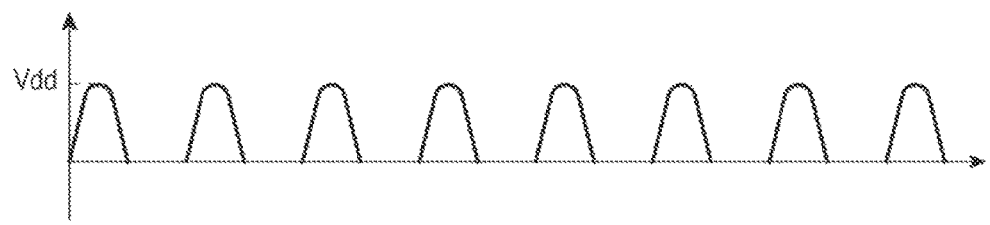
FIG. 1C is a waveform resulting from rectifying the wireless power only having a positive voltage in a rectifier, according to an embodiment of the present invention.

FIG. 1C is a waveform resulting from rectifying the wireless power having a positive voltage in the rectifier 120, according to an embodiment of the present invention.

Figure 1D:
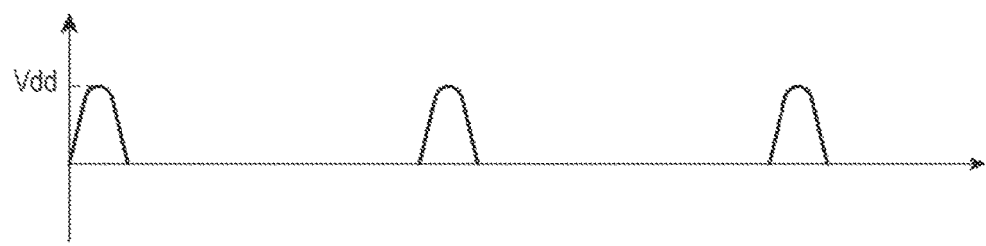
FIG. 1D is a waveform resulting from adjusting the wireless power in a power adjuster, according to an embodiment of the present invention.

FIG. 1D is a waveform resulting from adjusting the wireless power in the power adjuster 130, according to an embodiment of the present invention. The first time period may be 2.5 times greater than a period of the wireless power, and the second time period may be 0.5 times greater than the period of the wireless power. As shown in FIG. 1D, the adjusted wireless power is output only for the second time period and not output for the first time period, i.e., 2.5 times the period of the wireless power.

Figure 1E:
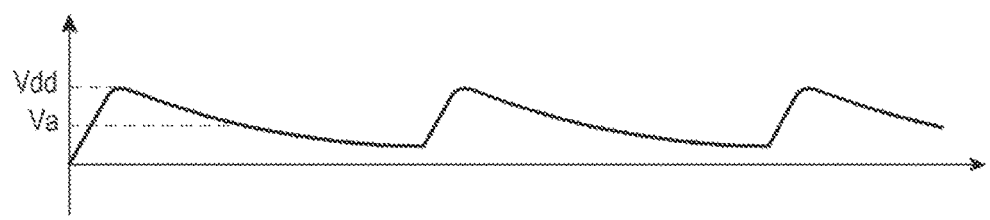
FIG. 1E illustrates output wireless power at an output end, according to an embodiment of the present invention.

FIG. 1E is a waveform of output wireless power at the output end, according to the embodiment of an present invention. In terms of the voltage the outputs of the wireless power is connected with each other, as shown in FIG. 1E. In this case, the magnitude of the average voltage Va may be reduced to a level lower than the amplitude Vdd and an rms value. Thus, the magnitude of voltage of the rectified wireless power output by the power adjuster 130 may be decreased compared to that of the originally received wireless power.

The controller 140 determines the first and second periods. As discussed above in connection with FIGS. 1B through 1E, the longer the first time period is, the less the magnitude of the output wireless power becomes because the wireless power circulates longer in the closed loop. In this manner, the magnitude of the output voltage may further be decreased. Conversely, if the controller 140 reduces the first time period, the wireless power circulates less in the closed loop and thus the magnitude of the output wireless power increases. The controller adjusts the magnitude of the output rectified wireless power by controlling the first and second time periods. The controller 140 controls general operations of the wireless power receiver, and be implemented with a microprocessor, a Central Processing Unit (CPU), or a mini computer, for example.

Figure 2:
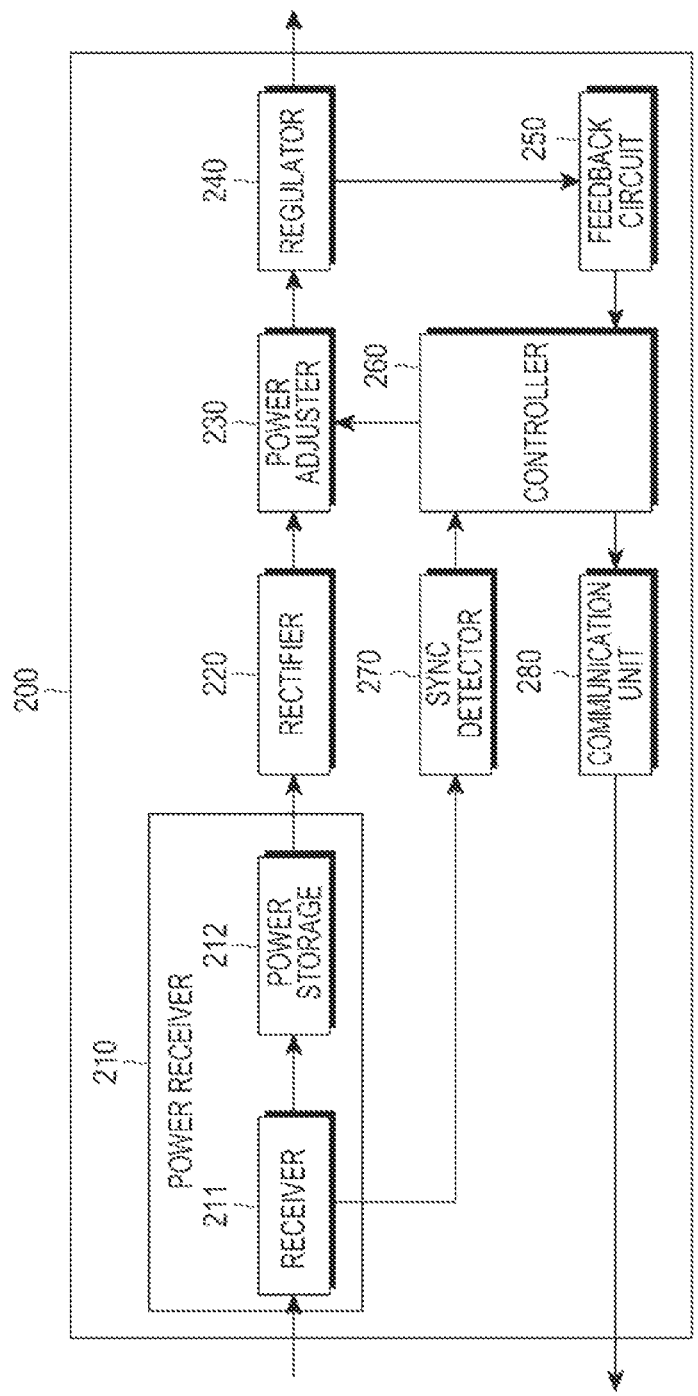
FIG. 2 illustrates the wireless power receiver, according to another embodiment of the present invention.

FIG. 2 illustrates the wireless power receiver, according to another embodiment of the present invention.

Referring to FIG. 2, the wireless power receiver 200 includes a power receiver 210, a rectifier 220, a power adjuster 230, a regulator, a feedback circuit 250, a controller 260, a sync detector 270, and a communication unit. Explanation of some overlapping components of the wireless power receiver 200 with the ones in FIG. 1A will be briefly mentioned or skipped, for purposes of conciseness.

The power receiver 210 includes a receiver 211 and a power storage 212. The receiver 211 receives the wireless power by resonating with an electromagnetic field produced by the wireless power supplier. When the receiver 211 is implemented using the loop coil, the inductance L of the loop coil is changeable, so an implementation of receiving electromagnetic waves, i.e., the wireless power with various frequencies, may be made.

The power storage 212 stores the power for the first time period. The power storage 212 may store the power if the power adjuster 230 is disconnected from the output end (not shown), and be implemented with a capacitor.

Under control of the controller 260, the power adjuster 230 is open-circuited for the first time period, thus disconnecting the rectifier 220 from the output end, and enables the wireless power to be stored in the power storage 212. The power adjuster 230 delivers the wireless power to the output end by being short-circuited for the second time period by using a switch, which may be a load switch. The power adjuster 230 will be described below in more detail.

The power adjuster 230 may be implemented with an N-type Metal-Oxide-Semiconductor Field-Effect Transistor (MOSFET). In this case, the power adjuster 230 may further include a bootstrapper for bootstrapping the power to be applied to the gate of the N-type MOSFET, which will be described below in detail.

The N-type MOSFET receives a control signal of the controller 260 as a gate input signal, according to which the N-type MOSFET may be open-circuited for the first time period and short-circuited for the second time period. In the first time period, the wireless power may be stored in the power storage 212.

The regulator 240 generates an output wireless power by filtering ripples of the rectified wireless power input by the power adjuster 230. The regulator 240 may be implemented with an LC filter, and may thus compensate the rectified wireless power to closer resemble a DC form. The regulator 240 may also control the output of the wireless power in order not to be overflowed at the output end. The wireless power output by the regulator 240 is output to the outside to be applied to a load or to be stored in a reservoir (not shown) such as a battery.

The feedback circuit 250 sends the regulated wireless power output by the regulator 240 back to the controller 260 as a feedback wireless power. The feedback circuit 250 may be implemented with a wire and a resistance to pass through the current by decreasing the voltage.

The controller 260 controls general operations of the wireless power receiver 200, and determines the first and second time periods. As described above in connection with FIGS. 1B to 1E, the magnitude of the rectified wireless power output by the power adjuster 230 may be changed according to the duration of the first or second time period determined by the controller 260. The output voltage finally output by the regulator 240 requires a voltage value used by the wireless power receiver 200 or a load having the wireless power receiver 200. Thus, the output voltage has to maintain a constant value, and if the value of the output voltage increases or decreases compared with the voltage value, the controller 260 controls the voltage to maintain the voltage value.

The controller 260 compares the value of the voltage of the feedback wireless power input by the feedback circuit unit 250 with the voltage value. The controller 260 includes a well-known comparator such as an OPerational AMPlifier (OP-AMP), which compares the feedback wireless power with the voltage value.

The controller 260 determines the first and second time periods based on the comparison result. For example, the controller 260 may reduce the output voltage by increasing the duration of the first time period if the comparison result indicates that the output voltage is greater than the voltage value. On the contrary, the controller 260 may increase the output voltage by increasing the duration of the second time period if the comparison result shows that the output voltage is less than the voltage value. In this manner, the wireless power receiver 200 may output the constant voltage, such as 5 V.

The controller 260 generates a power adjustment signal to control the power adjuster 230 during the first and second time periods and outputs the power adjustment signal to the power adjuster 230. For example, when the power adjuster 230 is the N-type MOSFET, the controller 260 generates and applies an application voltage to the gate of the N-type MOSFET.

The sync detector 270 may detect a sync signal from the wireless power from the power receiver 210. The sync signal includes information, such as a period of the wireless power received from the power receiver 210, and output the sync signal detected by the sync detector 270 to the controller 260.

The controller 260 generates the power adjustment signal based on the sync signal. For example, the controller 260 receives the sync signal informing that the wireless power has a 2.78 MHz frequency, generate a 2.78 MHz clock, and generates and output a power control signal having a zero value for the first time period of the clock.

The communication unit 280 communicates with the wireless power supplier based on a communication method. The controller 260 generates and outputs to the communication unit 280 the wireless power control signal to control the supplied wireless power based on the feedback wireless power. The communication unit 280 transmits the input wireless power control signal to the wireless communication supplier, which may in turn control the wireless power to be supplied based on the wireless power control signal.

The wireless power control signal includes at least one of identification information of the wireless power receiver, information regarding wireless reception, position information, environment setting information, safety-related information, and control information for the wireless power supplier. The control information for the wireless power supplier includes at least one of control information of an application voltage of the wireless power supplier, and control information of frequency and duty cycle of a power supply signal.

The wireless power supplier changes the magnitude or efficiency of the wireless power for supply by changing the application voltage of the wireless power supplier, the frequency or duty cycle of the power supply signal based on the input wireless power control signal.

For example, the controller 260 generates the wireless power control signal to request power reduction if the output voltage is greater than the voltage value based on the comparison result, and controls the communication unit 280 to transmit the wireless power control signal.

Upon reception of the wireless power control signal to request the power reduction, the wireless power supplier may reduce the power for supply, such as by reducing the application voltage of the wireless power supplier.

Figure 3:
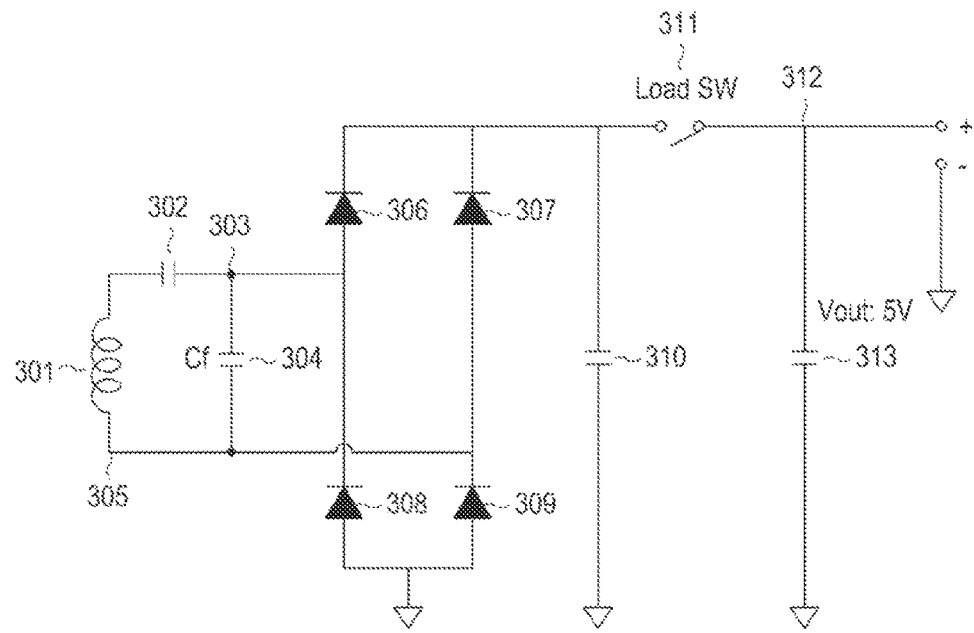
FIGS. 3 through 8 are circuit diagrams of the wireless power receiver, according to embodiments of the present invention.

FIG. 3 is a circuit diagram of the wireless power receiver, according to an embodiment of the present invention.

Referring to FIG. 3, the wireless power receiver includes a power receiver 301 implemented with a coil. The power receiver 301 has one end connected to an end of a capacitor 302, and the other end of the capacitor 302 is connected to a node 303.

A capacitor 304 capable of storing the power for the first time period has one end connected to the node 303 while having the other end connected to a node 305. The node 305 is connected to the other end of the power receiver 301.

The rectifier includes full-bridge diodes, which are four diodes 306, 307, 308, and 309 as shown in FIG. 3. One end of the diode 306 is connected to the node 303, and the other end is connected to an end of the diode 307 and a power adjuster 311. The one end of the diode 306 is also connected to an end of the diode 308, and the other end of the diode 308 is connected to the ground and an end of the diode 309. The other end of the diode 309 is connected to the other end of the diode 307 and the node 305. A capacitor 310 has an end connected to the diodes 306 and 307, and the power adjuster 311. The other end of the capacitor 310 is grounded.

An end of the power adjuster 311 is connected to a respective end of each of the diodes 306 and 307, and a capacitor 310, and the other end is connected to a node 312. The power adjuster 311 may be a load switch, which may be open-circuited for the first time period and short-circuited for the second time period, as described above.

The node 312 is connected to the power adjuster 311, a capacitor 313, and an output end. The power having 5V voltage, for example, is output at the output end.

Figure 4:
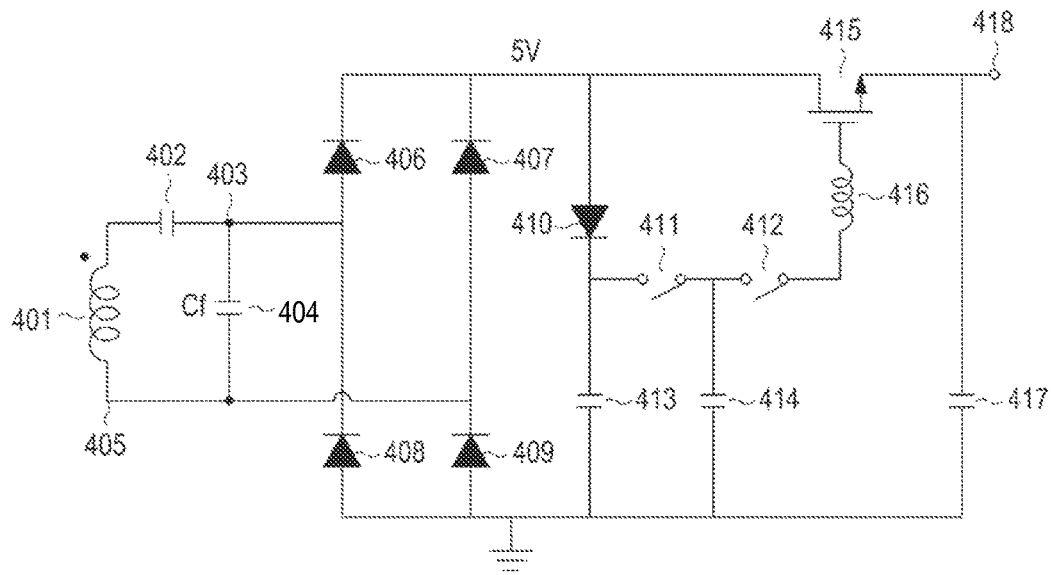

FIG. 4 is a circuit diagram of the wireless power receiver, according to another embodiment of the present invention.

Referring to FIG. 4, the wireless power receiver includes a power receiver 401. The power receiver 401 may be implemented with a coil. The power receiver 401 has one end connected to an end of a capacitor 402. The other end of the capacitor 402 is connected to a node 403.

A capacitor 404 capable of storing the power for the first time period has one end connected to the node 403 while having the other end connected to a node 405. The node 405 is connected to the other end of the power receiver 401.

The rectifier includes full-bridge diodes, which are four diodes 406, 407, 408, and 409 as shown in FIG. 4. One end of the diode 406 is connected to the node 403, and the other end is connected to an end of the diode 407 and a power adjuster 415. The one end of the diode 406 may also be connected to an end of the diode 408, and the other end of the diode 408 is connected to the ground and an end of the diode 409. The other end of the diode 409 is connected to the other end of the diode 407 and the node 405.

The diodes 406 and 407 are connected to a bootstrapper 410 and the power adjuster 415, which may be an N-type MOSFET device and further includes the bootstrapper 410 for bootstrapping the voltage to be applied to the gate of the N-type MOSFET device. The diodes 406 and 407 are connected to the source of the N-type MOSFET device.

The bootstrapper 410 bootstraps the voltage to be applied to the gate of the N-type MOSFET device. The bootstrapper 410 is implemented with a diode, which is connected to a low signal switch 411 and a low signal capacitor 413.

The wireless power receiver of FIG. 4 includes two capacitors 413 and 414 and two switches 411 and 412, which are alternately open-circuited and short-circuited in response to high and low signals. Signals are applied in a more reliable fashion with the use of the switches 411 and 412.

The low signal switch 411 has one end connected to the bootstrapper 410 and the low signal capacitor 413, and the other end to the high signal switch 412 and the high signal capacitor 414. The high signal switch is connected to an end of a coil 416, the other end of which is connected to the power adjuster 415, i.e., the gate of the N-type MOSFET device. The drain of the power adjuster 415 is connected to an output end 418, which is connected to a capacitor 417.

Figure 5:
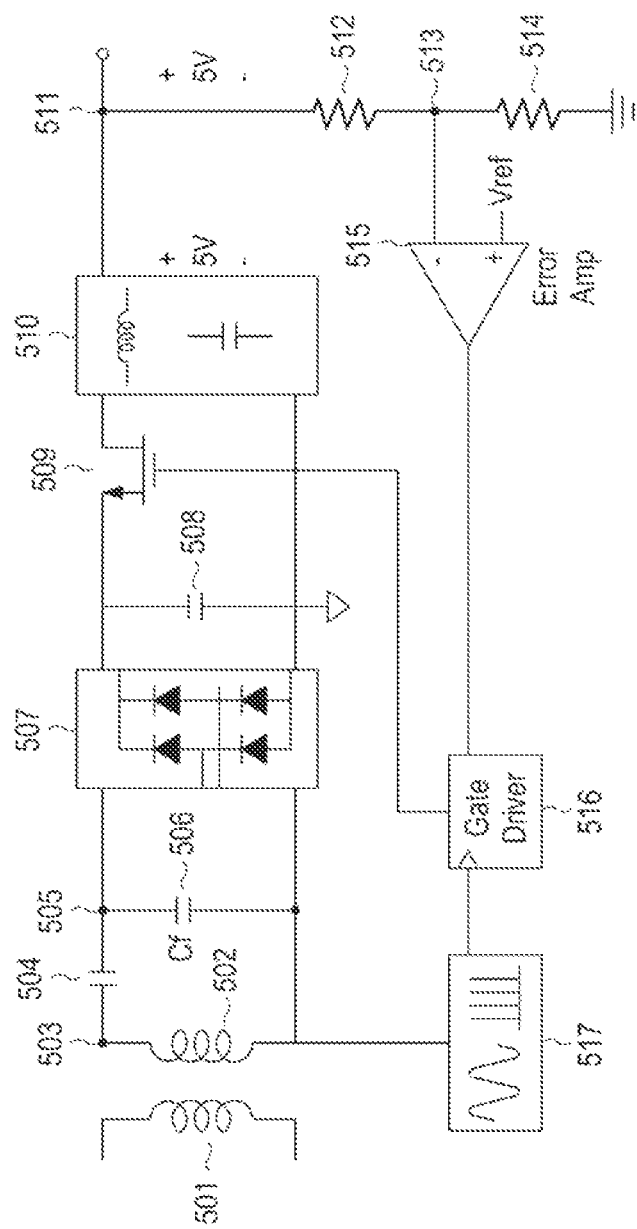

FIG. 5 is a circuit diagram of the wireless power receiver, according to another embodiment of the present invention.

The wireless power receiver includes a wireless power transmitter 501, and electromagnetic waves which radiate from the wireless power transmitter 501 are absorbed by the wireless power receiver 502.

Referring to FIG. 5, the wireless power receiver includes a power receiver 502, which is implemented with a coil. The power receiver 502 has one end connected to a node 503. The node 503 is connected to an end of a capacitor 504. The other end of the capacitor 504 is connected to a node 505. The node 505 is connected to a rectifier 507 and a capacitor 506.

The rectifier 507 is connected to a capacitor 508 in parallel, and to a power adjuster 509.

The power adjuster 509 is connected to an end of a regulator 510 that has a coil and a capacitor. An output of the regulator 510 is connected to an output end 511. The regulator 510 generates an output wireless power by filtering out ripples of the rectified wireless power input by the power adjuster 509. The regulator 510 may be implemented with an inductor/capacitor (LC) filter, and may thus compensate the rectified wireless power to closer resemble a DC form. The regulator 510 may also control the output of the wireless power so that the wireless power does not overflow at the output end. The wireless power output by the regulator 510 is output to the outside to be applied to a load or to be stored in a reservoir (not shown) such as a battery.

The output end 511 is connected to a node 513 through a resistor 512. The resistor 512 causes a voltage drop and the output voltage may be returned.

The controller includes a comparator 515 and a processing unit 516. The comparator 515 may be implemented with an OP-AMP, having a first input connected to a node 513 and second input to a voltage Vref. An output of the comparator 515 is connected to the processing unit 516.

The processing unit 516 is connected to a sync detector 517, and output to the gate of N-type MOSFET 509 the power adjustment signal generated in the above-described manner.

The sync detector 517 is connected to the other end of the power receiver 502, and outputs a detected sync signal to the processing unit 516.

Figure 6:
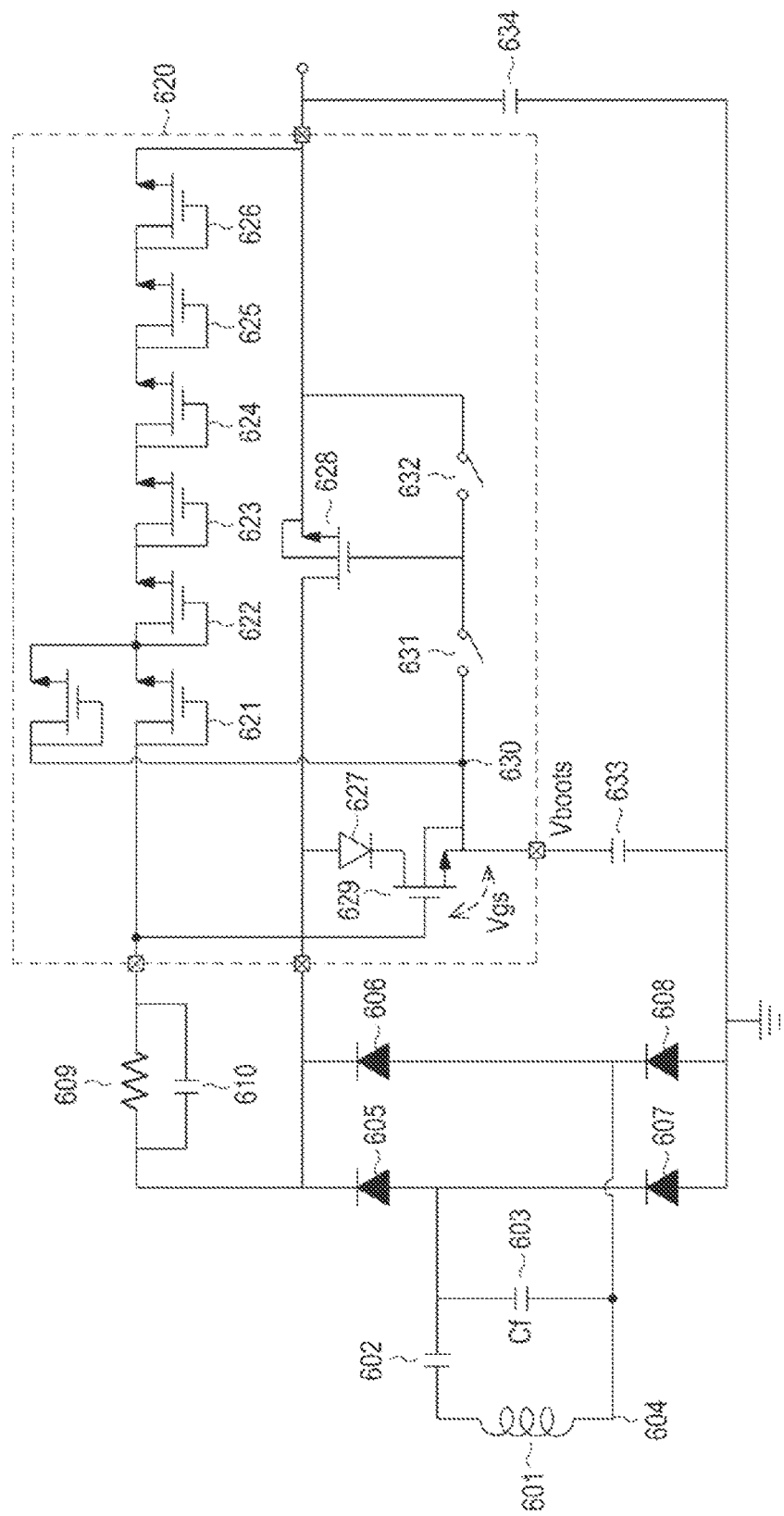

FIG. 6 is a circuit diagram of the wireless power receiver, according to another embodiment of the present invention.

Referring to FIG. 6, the wireless power receiver includes a power receiver 601, which is implemented with a coil. The power receiver 601 has one end connected to an end of a capacitor 602. The other end of the capacitor 602 is connected to a capacitor 603 and an end of a diode 605.

The rectifier includes full-bridge diodes, which are four diodes 605, 606, 607, and 608 as shown in FIG. 6. An end of the diode 605 is connected to a respective end of each of the capacitor 602, the capacitor 603, and the diode 607, and the other end of the diode 605 is connected to an end of the diode 606, a resistor 609, and a capacitor 610.

The diodes 605 and 606 are connected to a diode 627 and a power adjuster 628. The power adjuster 628 may be an N-type MOSFET device and has a bootstrapper for bootstrapping a voltage applied to the gate of the N-type MOSFET device.

The bootstrapper includes a plurality of MOSFET devices 621, 622, 623, 624, 625, and 626, and a diode 627.

A MOSFET device 629 connected to the diode 627 and a node 630 senses ripple forms to generate a control signal for the gate of the MOSFET device 628 to be open-circuited or short-circuited. A voltage at the node 630 is different from a voltage at the other end of the resistor 609 by Vgs and has a bootstrapped voltage applied.

The MOSFET device 629 is connected to an end of a capacitor 633, the other end of which is grounded.

The node 630 is connected to an end of a low signal switch 631, the other end of which is connected to the gate of the power adjuster 628 and an end of a high signal switch 632. The other end of the high signal switch 632 is connected to an output end connected to an end of a capacitor 634. The other end of the capacitor 634 is grounded.

Figure 7:
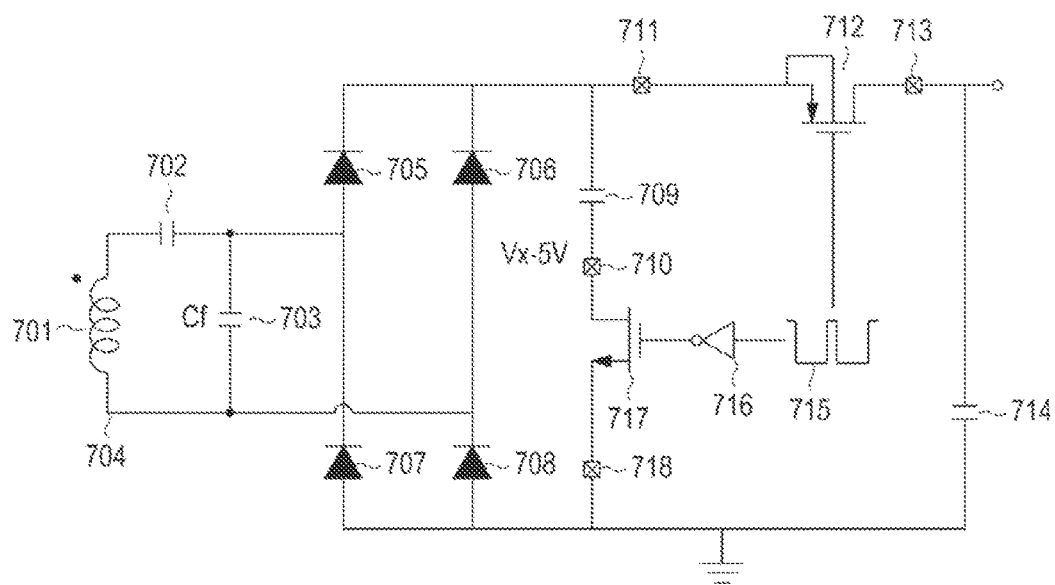

FIG. 7 is a circuit diagram of the wireless power receiver, according to another embodiment of the present invention.

Referring to FIG. 7, the wireless power receiver includes a power receiver 701, which is implemented with a coil. The power receiver 701 has one end connected to an end of a capacitor 702. The other end of the capacitor 702 is connected to a capacitor 703 and an end of a diode 705.

The rectifier includes full-bridge diodes, which are four diodes 705, 706, 707, and 708 as shown in FIG. 7. One end of the diode 705 is connected to the capacitor 703, and the other end is connected to an end of the diode 706 and a node 711.

The node 711 is connected to a power adjuster 712 and an end of a capacitor 709. The power adjuster 712 is a P-type MOSFET device and, as opposed to that of FIG. 6, does not include any bootstrapper.

The other end of the capacitor 709 is connected to a node 710 possibly having a voltage decreased from a voltage at the node 711 by 5V. The node 710 is connected to the source of the MOSFET device 717.

The gate of the MOSFET device 717 is connected to an inverter 716 outputting a signal 715 in a certain waveform. The signal 715 inputs to the gate of the power adjuster 712 to control the power adjuster 712 to be open-circuited or short-circuited. The drain of the MOSFET device 717 is connected to a node 718, which is grounded.

The source of the power adjuster 712 is connected to an output end 713, which is connected to an end of a capacitor 714. The other end of the capacitor 714 is grounded.

Figure 8:
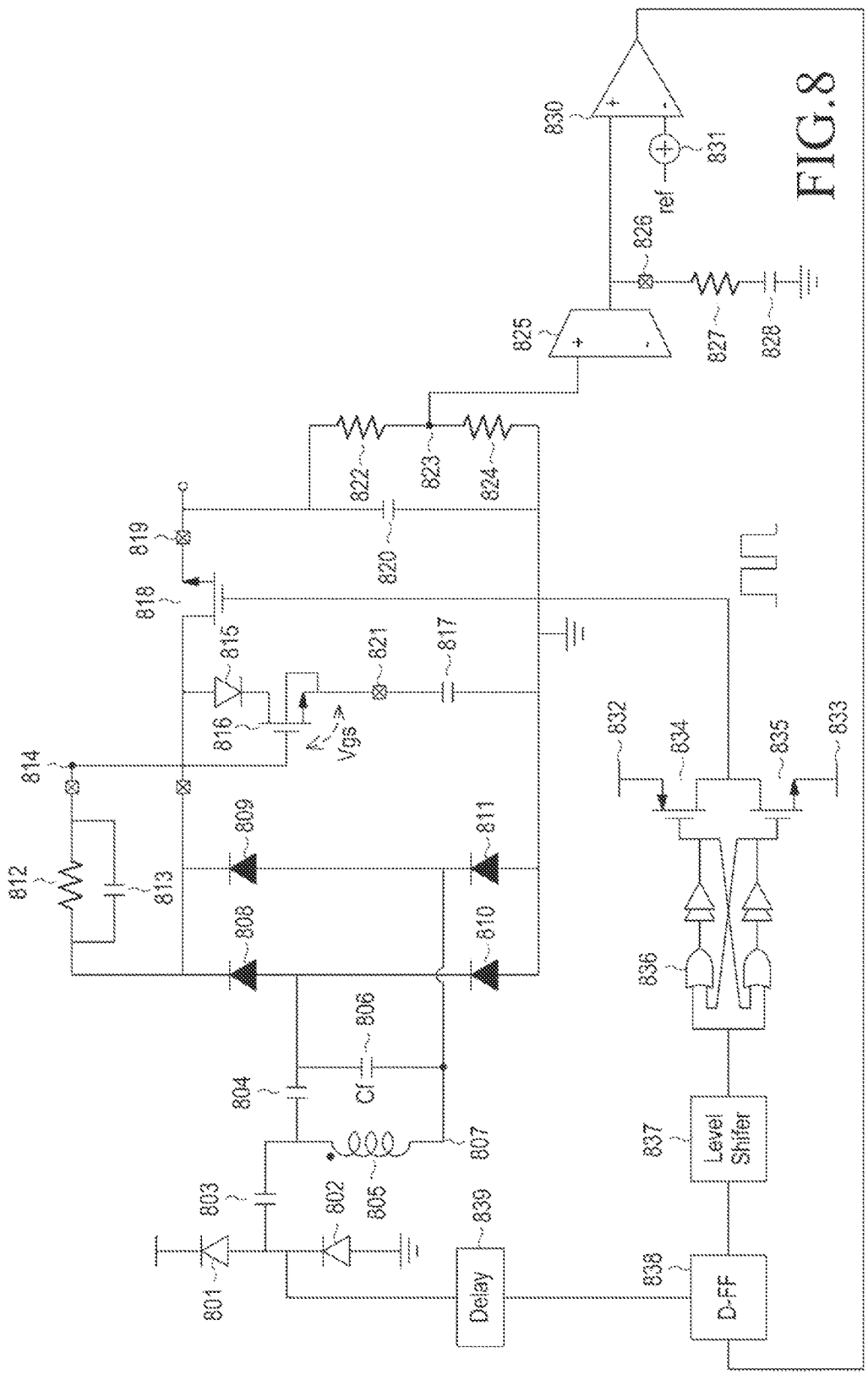

FIG. 8 is a circuit diagram of the wireless power receiver, according to another embodiment of the present invention.

In contrast to the wireless power receiver of FIG. 7, the wireless power receiver of FIG. 8 includes a power receiver 805 having a front end connected to diodes 801 and 802, and a capacitor 803. An end of the diode 802 is grounded and the other end is connected to a delay unit 839, the diode 801, and an end of the capacitor 803. The other end of the capacitor 803 is connected to an end of a capacitor 804 and the power receiver 805.

The other end of the capacitor 804 is connected to an end of a capacitor 806 and full-bridge diodes 808, 809, 810, and 811. An end of a capacitor 806 is connected to the full-bridge diodes 808, 809, 810, and 811 and a node 807 connected to the power receiver 805.

The full-bridge diodes 808, 809, 810, and 811 are connected to an end of a resistor 812 and an end of a capacitor 813. The other ends of the resistor 812 and the capacitor 813 are connected to a node 814, which is connected to the gate of a MOSFET device 816. The source of the MOSFET 816 is connected to a bootstrapper 815, and the drain of the MOSFET 816 to a node 821. The node 821 is connected to an end of a capacitor 817, the other end of which is grounded.

The full-bridge diodes 808, 809, 810, and 811 are connected to the bootstrapper 815 and to the source of a power adjuster 818. The drain of the power adjuster 818 is connected to an output end 819. The output end 819 is connected to an end of a capacitor 820 and an end of a resistor 822. An end of the resistor 822 is connected to a node 823, which is connected to an end of a resistor 824. The other ends of the capacitor 820 and the resistor 824 are grounded.

The node 823 is connected to a positive input of a multiplexer 825, and a negative input of the multiplexer 825 has, for example, −1.2 V voltage applied thereto. An output of the multiplexer 825 is connected to a node 826 and a positive input of a comparator 830. A negative input of the comparator 830 has a reference voltage applied thereto in a particular waveform, such as a saw waveform. An output of the comparator 830 is connected to a D-flipflop 838.

The node 826 is connected to an end of a resistor 827 and an end of a capacitor 829. The other end of the resistor 827 is connected to an end of a capacitor 828, and the other end of the capacitor 828 may be grounded.

The D-flipflop 838 is connected to the comparator 830 and the delay, as described above. The D-flipflop 838 is also connected to a level shifter 837, which is, in turn, connected to a gate driver 836. The gate driver 836 divides an input into two outputs, each of which are input to an AND device or an OR device. The other ends of the AND and OR devices are connected to the gates of MOSFET devices 834 and 835, respectively.

Outputs of the AND and OR devices are also connected to the gates of MOSFET devices 834 and 835, respectively. A bootstrapped voltage is applied to the source 834 of the MOSFET device 834 and an output voltage is applied to the drain 833 of the MOSFET device 835. The drain of the MOSFET device 834 and the source of the MOSFET device 835 are connected together to the gate of the power adjuster 818, and thus the output of the MOSFET devices 834 and 835 is the control signal for the gate of the power adjuster 818.

With this configuration, the control signal for the gate of the power adjuster 818 is produced by a series of the comparator 830 and the error amplification part (838, 837, 836, 834, and 835), which defines a feedback loop.

Figure 9:
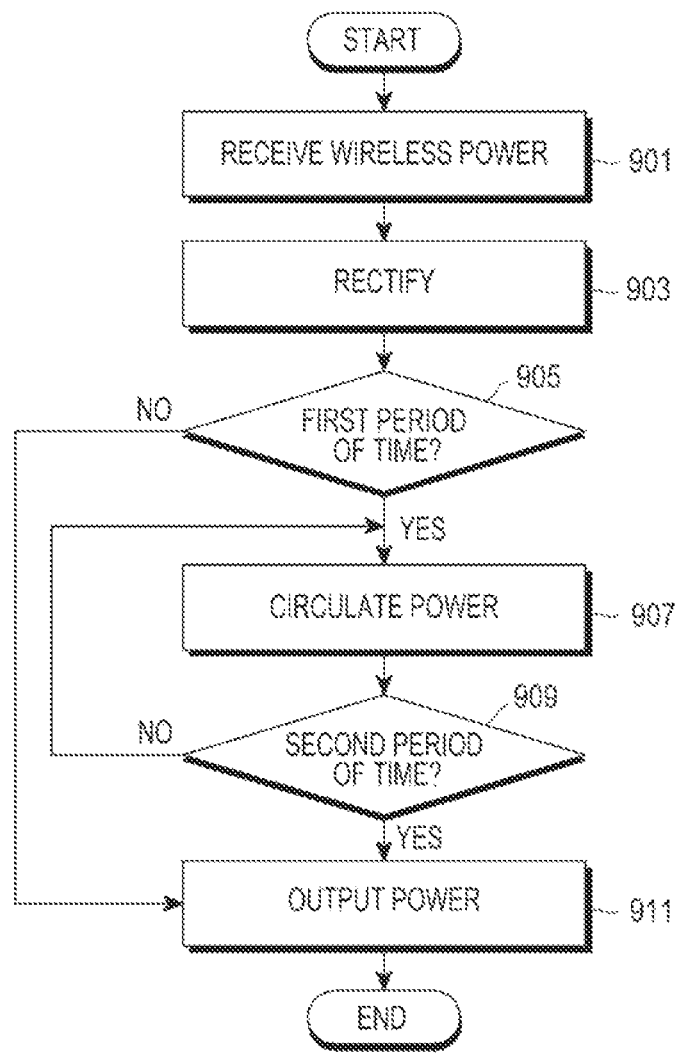
FIG. 9 illustrates a method of controlling the wireless power receiver, according to an embodiment of the present invention.

FIG. 9 illustrates a method of controlling the wireless power receiver, according to an embodiment of the present invention.

The wireless power receiver receives the wireless power from the wireless power supplier, in step S901. Since the manner of receiving the wireless power has been described above, the explanation will be omitted here. The wireless power receiver rectifies a received current, in step S903.

The wireless power receiver controls the wireless power to circulate in the wireless power receiver by disconnecting the path to the output end of the wireless power receiver during the first time period, in step S907. The wireless power receiver may also output a rectified wireless power during the second time period, in step S911.

The method of controlling the wireless power receiver may further include sending back the rectified wireless power as a feedback wireless power and analyzing the feedback wireless power, in which case the first and second time periods may be determined based on the feedback wireless power.

The first and second time periods may be determined based on comparison between a voltage of the feedback wireless power and a reference voltage, and the wireless power receiver controls its operations during the first and second time periods by generating the power adjustment signal to control the wireless power receiver for each of the first and second time periods.

The method of controlling the wireless power receiver may further include a step of detecting a sync signal to be in phase with the power adjustment signal from the received wireless power, in which case the power adjustment signal may be generated based on the sync signal.

The power adjustment signal may be generated and output by generating a wireless power control signal to control the wireless power based on the feedback wireless power, in which case the method of controlling the wireless power receiver may further include a step of transmitting the wireless power control signal to the wireless power supplier. In this regard, the wireless power control signal includes at least one of identification information of the wireless power receiver, information regarding wireless reception, position information, environment setting information, safety-related information, and control information for the wireless power supplier, and particularly, the control information for the wireless power supplier includes at least one of control information of an application voltage of the wireless power supplier, control information of the frequency of a power supply signal, and control information of the duty cycle of the power supply signal.

The method of controlling the wireless power receiver may further include generating an output wireless power by filtering out ripples of the rectified wireless power.

According to the present invention, the wireless power receiver adjusts the magnitude of the received wireless power by periodically open-circuiting and short-circuiting of a switch.

Compared with a conventional AC-to-DC converter, compactness and lightness of the wireless power receiver are achieved. In addition to the switch, the resonant inductor and capacitor facilitates the achievement of a more reliable DC current.

Furthermore, more reliable DC power is provided by control of the switch based on the sync signal of the wireless power received from the power receiver and the output power, and switching control is more easily performed by adopting a structure having a load switch at the end of a rectifier.

Several embodiments have been described in connection with mobile communication terminals, but it will be understood that various modifications can be made without departing the scope of the present invention. Thus, it will be apparent to those ordinary skilled in the art that the invention is not limited to the embodiments described, but can encompass not only the appended claims but their equivalents.

What is claimed is:

1. A wireless power receiver that wirelessly receives power from a wireless power supplier, the wireless power receiver comprising:
    a power receiver configured to receive the power wirelessly from the wireless power supplier, wherein the power receiver comprises a coil, a first capacitor connected to the coil in series and a second capacitor connected to the coil in parallel;
    a rectifier, connected to the power receiver, configured to rectify the received power;
    a switch configured to connect the rectifier to an output end; and
    a controller configured to:
        control the switch to disconnect the rectifier from the output end for a duration of a first time period such that the received power circulates in a closed loop composed of the coil, the first capacitor and the second capacitor,
        control the switch to connect the rectifier to the output end for delivering the rectified power to the output end without converting the rectifier power for a duration of a second time period, periodically,
        determine whether to increase or to decrease a magnitude of power to be delivered from the rectifier to the output end from a first non-zero value to a second non-zero value, and
        adjust the duration of the first time period and the duration of the second time period based on the determination result,
    wherein the magnitude of the power to be delivered from the rectifier to the output end is adjusted by changing a ratio of the duration of the first time period to the duration of the second time period.

2. The wireless power receiver of claim 1, wherein the switch is configured to be open-circuited to disconnect the rectifier from the output end during the duration of the first time period and to be short-circuited to connect the rectifier to the output end during the duration of the second time period.

3. The wireless power receiver of claim 1, wherein the switch comprises an N-type metal-oxide-semiconductor field-effect transistor (MOSFET) device,
    wherein the controller is further configured to determine the duration of the first time period and the duration of the second time period by adjusting a voltage applied to a gate of the N-type MOSFET.

4. The wireless power receiver of claim 3, further comprising a bootstrapper that bootstraps the voltage applied to the gate of the N-type MOSFET.

5. The wireless power receiver of claim 4, wherein the bootstrapper comprises a resonance inductor, connected to the gate of the N-type MOSFET device, configured to reduce a loss of the bootstrapping, and first and second switches configured to be alternately open-circuited and short-circuited in response to high and low signals.

6. The wireless power receiver of claim 1, wherein the switch comprises a P-type metal-oxide-semiconductor field-effect transistor (MOSFET) device.

7. The wireless power receiver of claim 1, further comprising a feedback circuit configured to send the rectified power to the controller as feedback power,
    wherein the controller is further configured to determine the duration of the first time period and the duration of the second time period based on the feedback power.

8. The wireless power receiver of claim 7, wherein the controller is further configured to compare a voltage of the feedback power to a reference voltage, determine the duration of the first time period and the duration of the second time period based on the comparison result, and generate a power adjustment signal to control an operation of the switch.

9. The wireless power receiver of claim 8, further comprising a sync detector that detects, from the received power, a sync signal to be in phase with the power adjustment signal,
wherein the controller is further configured to generate the power adjustment signal based on the sync signal.

10. The wireless power receiver of claim 7, further comprising a communication unit configured to communicate with the wireless power supplier,
wherein the controller is further configured to generate a wireless power control signal to control the power transmitted from the wireless power supplier based on the feedback power, and control the communication unit to transmit the wireless power control signal to the wireless power supplier.

11. The wireless power receiver of claim 10, wherein the wireless power control signal includes at least one of identification information of the wireless power receiver, information regarding wireless reception, position information, environment setting information, safety-related information, and control information for the wireless power supplier.

12. The wireless power receiver of claim 11, wherein the control signal for the wireless power supplier includes at least one of control information for an application voltage of the wireless power supplier, control information of frequency and duty cycle of a power supply signal.

13. The wireless power receiver of claim 1, further comprising a regulator configured to generate output power by filtering out ripples of the rectified power.

14. The wireless power receiver of claim 1, wherein the rectifier comprises full-bridge diodes.

15. A method of controlling a wireless power receiver for wirelessly receiving power from a wireless power supplier, wherein the power receiver comprises a coil, a first capacitor connected to the coil in series and a second capacitor connected to the coil in parallel, the method comprising:
receiving the power wirelessly from the wireless power supplier;
rectifying the received power;
preventing the rectified power from being output by disconnecting a path to the output end for a duration of a first time period such that the received power circulates in a closed loop composed of the coil, the first capacitor and the second capacitor, and delivering the rectified power to the output end without converting the rectified power for a duration of a second time period, periodically,
determining whether to increase or to decrease a magnitude of power to be delivered from the rectifier to the output end from a first non-zero value to a second non-zero value, and
adjusting the duration of the first time period and the duration of the second time period based on the determination result,
wherein the magnitude of the power to be delivered from the rectifier to the output end is adjusted by changing a ratio of the duration of the first time period to the duration of the second time period.

16. The method of claim 15, further comprising sending the rectified power back as feedback power and analyzing the feedback power,
wherein the duration of the first time period and the duration of second time period are determined based on the feedback power.

17. The method of claim 16, wherein the first and second time periods are determined based on a comparison between a voltage of the feedback power and a reference voltage,
further comprising generating and outputting a power adjustment signal to control the wireless power receiver for each of the first and second time periods.

18. The method of claim 17, further comprising detecting from the received power a sync signal to be in phase with the power adjustment signal,
wherein the generating and outputting of the power adjustment signal comprises generating the power adjustment signal based on the sync signal.

19. The method of claim 16, wherein generating and outputting the power adjustment signal comprises:
generating a wireless power control signal to control the power transmitted from the wireless power supplier based on the feedback power; and
transmitting the wireless power control signal to the wireless power supplier.

20. The method of claim 19, wherein the wireless power control signal includes at least one of identification information of the wireless power receiver, information regarding wireless reception, position information, environment setting information, safety-related information, and control information for the wireless power supplier.

21. The method of claim 20, wherein the control signal for the wireless power supplier includes at least one of control information for an application voltage of the wireless power supplier, control information of frequency and duty cycle of a power supply signal.

22. The method of claim 15, further comprising generating an output power by filtering out ripples of the rectified power.

* * * * *